Sept. 3, 1968    E. B. PARKES    3,400,346
FLASHER UNIT FOR OPERATING INDICATOR LAMPS ON A ROAD VEHICLE
Filed April 25, 1966    2 Sheets-Sheet 1

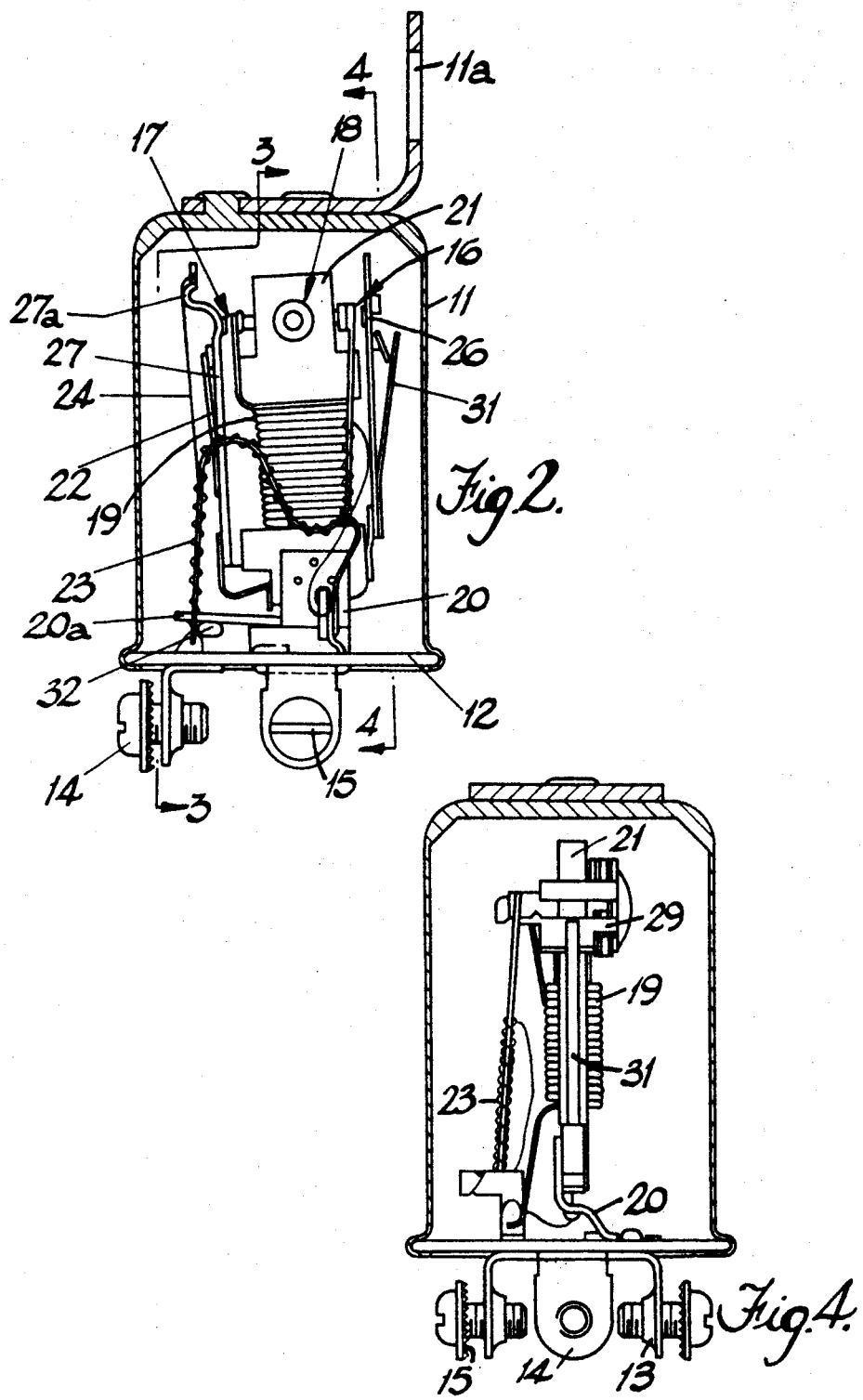

United States Patent Office 3,400,346
Patented Sept. 3, 1968

3,400,346
FLASHER UNIT FOR OPERATING INDICATOR
LAMPS ON A ROAD VEHICLE
Eric Bernard Parkes, Birmingham, England, assignor to
Joseph Lucas Industries Limited, Birmingham, England
Filed Apr. 25, 1966, Ser. No. 544,759
Claims priority, application Great Britain, Apr. 29, 1965,
18,024/65
1 Claim. (Cl. 335—141)

ABSTRACT OF THE DISCLOSURE

A flasher unit for operating direction indicator lamps on road vehicles includes a combined actuating wire and ballast resistor which when cold holds open the main contacts through which current flows to the indicator lamps. When current is passed through the actuating wire it expands to allow the main contacts to close, current flowing through the main contact energising the indicator lamps and also energising an electro-magnet winding which holds the main contacts closed. When the main contacts are closed, the actuating wire is short-circuited and so cools down, so that eventually the contacts are opened again. An extra winding is included in series with the actuating wire which opposes the main electro-magnet winding.

---

This invention relates to flasher units for operating direction indicator lamps on road vehicles.

A flasher unit according to the invention comprises in combination first and second terminals which in use are connected respectively to the battery of a vehicle and to a pilot lamp, a third terminal which in use is connected through a direction indicator switch to the direction indicator lamps of the vehicle, a normally open pilot contact connected between the first and second terminals, a main contact connected in series with an electro-magnet winding between the first and third terminals, resilient means urging the main contact to a closed position, and a combined actuating wire and ballast resistor connected between the first and third terminals, the arrangement being such that when no current flows through the actuating wire it holds the main contacts open, but when current is caused to flow through the actuating wire it expands to permit the main contact to close, whereupon the electro-magnet winding is energised and holds the main contact closed and at the same time closes the pilot contact, the electro-magnet winding remaining energised until the actuating wire cools down sufficiently to open the main contact, whereupon the cycle of operation is repeated.

Figure 1:
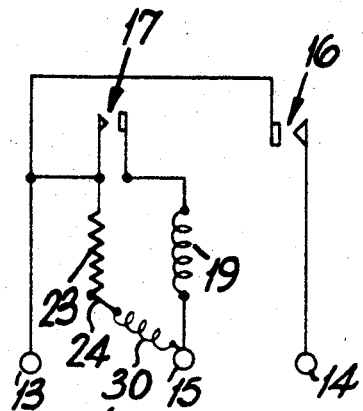
Figure 3:
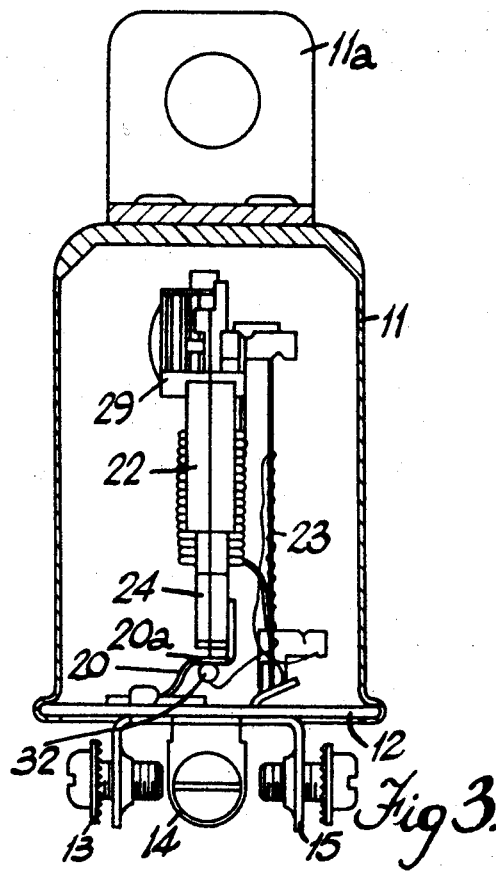

One example of the invention is illustrated in the accompanying drawings wherein FIGURE 1 is a circuit diagram of a flasher unit, FIGURE 2 is a sectional side view of the flasher unit and FIGURES 3 and 4 are sectional views on the lines 3—3 and 4—4 respectively in FIGURE 2.

Referring first to FIGURE 4 there is provided a first terminal 13 which in use in connected to the vehicle battery, a second terminal 14 which in use is earthed through a pilot lamp, and a third terminal 15 which is connected to the movable arm of a direction indicator switch, the direction indicator switch being movable in opposite angular directions to energise direction indicator lamps on opposite sides of the vehicle. The terminals 13, 14 are interconnected through a normally open pilot contact 16, whilst the terminals 13, 15 are interconnected through a main contact 17 in series with the winding 19 of an electro-magnet. The contact 17 is urged towards its closed position by a leaf spring, and a ballast resistor 23 is connected between the first and third terminals, the resistor 23 also constituting an actuating wire associated with the contact 17.

Referring now to FIGURES 2 to 4, the flasher unit comprises a cylindrical casing 11 which is closed at one end, the closed end being provided with a lug 11a by means of which the unit can be mounted on a road vehicle. Closing the open end of the casing 11 is an insulating board 12 which supports the terminals 13, 14, 15. Electrically connected to the terminal 13 and extending within the casing 11 is a conductive strip 20 to which is secured the core 21 of the electro-magnet 18, the winding 19 being wound on the core 21 but insulated therefrom.

Flexibly secured at their lower ends to the core 21 and electrically connected thereto are the movable members 26, 27 of the contacts 16, 17, the member 27 being secured to the core 21 through the intermediary of a spring 27a urges the contact 17 to its closed position. The fixed members of the contacts 16, 17 are also secured to the core 21 but are insulated therefrom and from each other. A generally U shaped support 29 is secured to the core 21 and one limb of the support 29 supports the leaf spring 22, which supplements the spring 27a in urging the contact 17 to its closed position, the other limb of the support 29 being engaged by a leaf spring 31 which urges the contact 16 to its open position.

Integral with the strip 20 is a plate 20a which extends parallel to the board 12 and is formed with a hole. The upper end of the member 27 is formed with an outwardly directed portion 27a to which is secured one end of the actuating wire 24, the wire 24 extending through the hole in the plate 20a and being connected at its other end through the resistor 23 to the terminal 15. As previously mentioned the wire 24 is constituted by the ballast resistor 23. A glass bead 32 is anchored to the wire 24 on the side of the plate 20a remote from the portion 27a of the member 27. The bead 32 is so dimensioned that it cannot pass through the hole in the plate 20a, the arrangement being such that when the wire 24 is at a normal temperature the bead 32 engages the plate 20a and the wire 24 is sufficiently taut to maintain the contact 17 open against the action of the spring 22. The bead 32 also serves to insulate the wire 24 from the plate 20a.

In use, when the direction indicator switch is actuated, current flows from the terminal 13 through the wire 24 and thence by way of the terminal 15 to the direction indicator lamps. This current is insufficient to energise the direction indicator lamps, but causes the wire 24 to expand, thereby permitting the springs 27a, 22 to close the contact 17. As soon as the contact 17 closes, the winding 19 is energised to hold the contact 17 closed and to close the contact 16, and at this time both the pilot lamp and the direction indicator lamps are energised. The current flowing through the resistor 23 is now short-circuited, and so the wire 24 cools down and opens the contact 17 again so that the cycle is terminated. The sequence of operations described continues as long as the direction indicator switch is closed.

The construction of the present flasher unit differs from known constructions only in that the ballast resistor 23 and actuating wire 24 are connected directly to the terminal 15 rather than in series with the winding 19, so that when the contact 17 is open no current flows in the winding 19 and the flux in the electro-magnet core falls to zero. This difference, though small, is important because when the circuit to the winding 19 is broken, the rate of opening of the contact is increased as compared with known constructions, so reducing arcing at the contact 17. This is particularly important if a 24 volt battery is used in the vehicle. The arrangement has the additional advantage that the contact 16 need not be set so accurately.

In certain cases, a further winding 30 may be included in the circuit, connected between the wire 24 and resistor 23 and the terminal 15 and wound so as to electrically oppose the winding 19. When the contacts 16, 17 open, this winding 30 causes the flux to fall rapidly.

Having thus described my invention what I claim as new and desire to secure by Letters Patent is:

1. A flasher unit comprising in combination first and second terminals which in use are connected respectively to the battery of a vehicle and to a pilot lamp, a third terminal which in use is connected through a direction indicator switch to the direction indicator lamps of the vehicle, a normally open pilot contact connected between the first and second terminals, a main contact connected in series with an electro-magnet winding between the first and third terminals, resilient means urging the main contact to a closed position, and a combined actuating wire and ballast resistor connected between the first and third terminals, the arrangement being such that when no current flows through the actuating wire it holds the main contacts open, but when current is caused to flow through the actuating wire it expands to permit the main contact to close, whereupon the electromagnet winding is energised and holds the main contact closed and at the same time closes the pilot contact, the electro-magnet winding remaining energised until the actuating wire cools down sufficiently to open the main contact, whereupon the cycle of operation is repeated, the unit further including a second electro-magnet winding, connected in series with the actuating wire and ballast resistor, and so wound as to electrically oppose the first electro-magnet winding.

References Cited
UNITED STATES PATENTS 2,103,276   12/1937   Schmidinger _____ 335—141
2,674,730   4/1954    Klebanoff et al. _____ 335—141

BERNARD A. GILHEANY, *Primary Examiner.*